(12) United States Patent
Sawada

(10) Patent No.: US 8,010,877 B2
(45) Date of Patent: Aug. 30, 2011

(54) COMMUNICATION APPARATUS, COMMUNICATION CONTROL METHOD, AND COMPUTER PRODUCT

(75) Inventor: Junichi Sawada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1108 days.

(21) Appl. No.: 11/601,629

(22) Filed: Nov. 20, 2006

(65) Prior Publication Data

US 2008/0008180 A1   Jan. 10, 2008

(30) Foreign Application Priority Data

Jul. 4, 2006  (JP) ................................. 2006-184493

(51) Int. Cl.
*H04L 1/00* (2006.01)

(52) U.S. Cl. ........................................ 714/774; 714/776

(58) Field of Classification Search .................. 714/774, 714/776

See application file for complete search history.

(56) References Cited

U.S. PATENT DOCUMENTS

| | | | | |
|---|---|---|---|---|
| 5,329,527 A * | 7/1994 | Ujihashi et al. | ................ | 370/397 |
| 5,579,303 A * | 11/1996 | Kiriyama | ...................... | 370/252 |
| 5,805,805 A * | 9/1998 | Civanlar et al. | ................ | 709/220 |
| 6,079,042 A * | 6/2000 | Vaman et al. | .................. | 714/755 |
| 6,341,132 B1 * | 1/2002 | Benayoun et al. | ............. | 370/397 |
| 7,133,934 B1 * | 11/2006 | Rossello et al. | ............... | 709/249 |
| 7,328,393 B2 | 2/2008 | Chawla | | |
| 7,403,532 B2 * | 7/2008 | Doidge et al. | ........... | 370/395.53 |
| 7,526,202 B2 * | 4/2009 | Ovadia et al. | ................... | 398/51 |
| 7,529,489 B2 * | 5/2009 | Chiesa et al. | .................. | 398/138 |
| 7,539,925 B2 * | 5/2009 | Yamane | ......................... | 714/774 |
| 7,555,700 B2 * | 6/2009 | Takagi | .......................... | 714/774 |
| 7,581,155 B2 * | 8/2009 | Lee et al. | ....................... | 714/779 |

FOREIGN PATENT DOCUMENTS

| | | |
|---|---|---|
| JP | 2000-299712 | 10/2000 |
| JP | 2003-298560 | 10/2003 |

OTHER PUBLICATIONS

Japanese Notice of Rejection, English-language translation, mailed Jan. 18, 2011 for corresponding Japanese Application No. 2006-184493.

* cited by examiner

*Primary Examiner* — Stephen M Baker
(74) *Attorney, Agent, or Firm* — Fujitsu Patent Center

(57) ABSTRACT

A communication apparatus that is present between each of receiver and sender LANs including a user network and a WAN, and relays a packet exchanged between the sender and receiver LANs through the WAN while correcting an error in the packet. The communication apparatus determines whether to perform error correction on a packet received from the sender LAN. When it is determined not to perform the error correction, the communication apparatus instantly transfers the packet to the receiver LAN.

9 Claims, 8 Drawing Sheets

FIG.6

| NO. | MAC ADDRESS | | VLAN-ID | CoS | IP ADDRESS | | PROTO-COL | ToS/DIFF-SERVE | DESTINATION PORT NUMBER | INPUT PORT NUMBER | APPLIED/UNAPPLIED |
|---|---|---|---|---|---|---|---|---|---|---|---|
| | SOURCE | DESTINATION | | | SOURCE | DESTINATION | | | | | |
| 1 | 00e000520100 | - | - | - | - | - | - | - | - | 1 | APPLIED |
| 2 | - | 00e000520100 | 100 | - | 192.168.1.2 | - | - | - | - | 1 | APPLIED |
| 3 | - | - | - | - | 192.168.1.2 | - | - | - | 10000 | 1 | APPLIED |
| 4 | - | - | - | - | 192.168.1.2 | - | - | - | 10001 | 1 | APPLIED |
| 5 | - | - | - | - | 192.168.1.2 | - | - | - | 10002 | 1 | APPLIED |
| 6 | - | - | - | - | 192.168.1.2 | - | - | - | 10003 | 1 | APPLIED |
| 7 | - | - | - | - | 192.168.1.2 | - | - | - | 10004 | 1 | APPLIED |
| 8 | - | - | - | - | 192.168.1.2 | - | - | - | 10005 | 1 | APPLIED |
| 9 | - | - | 200 | - | - | - | - | - | - | 2 | UNAPPLIED |
| 10 | - | - | 300 | - | - | - | - | - | - | 3 | UNAPPLIED |
| ... | ... | ... | ... | ... | ... | ... | ... | ... | ... | ... | ... |

COMMUNICATION APPARATUS, COMMUNICATION CONTROL METHOD, AND COMPUTER PRODUCT

CROSS REFERENCE TO RELATED APPLICATIONS

This application claims the benefit under 35 U.S.C. Section 119, of Japanese Patent Application No. 2006-184493, filed Jul. 4, 2006, which is hereby incorporated by reference in its entirety into this application.

BACKGROUND OF THE INVENTION

1. Field of the Invention

The present invention generally relates to network communication, and specifically relates to large-scale network communication using LANs and WAN.

2. Description of the Related Art

Recently, a wide area network (WAN) has been increasingly used. The WAN connects local area networks (LANs) to which a plurality of terminal devices is communicably connected, and allows the terminal devices on the different LANs to hold communication therebetween. The WAN, which is also referred to as "Inter-LAN connection", enables a large-scale network to be easily constructed by connecting existing LANs to one another.

Similarly to packet communication in the LAN, an error possibly occurs in packet communication in the WAN. Japanese Patent Application Laid-open No. 2000-299712, for example, discloses a data communication system capable of reducing communication errors that occur in packet communication in the WAN by a selected optimum error correcting method.

According to the conventional error correcting method, the result of calculation made based on packet data is added to a packet as redundant data in advance. If the redundant data does not match the result of recalculation made when the packet is received, it is determined that the packet contains an error.

However, with the conventional technique represented by the method disclosed in Japanese Patent Application Laid-open No. 2000-299712, when it is determined that a packet contains an error and the error cannot be corrected, a receiver communication apparatus discards the packet. Due to this, if a WAN-side link frequently causes minor errors as seen in a microwave-multiplex radio link, a receiver LAN is unable to receive packets.

SUMMARY OF THE INVENTION

It is an object of the present invention to at least partially solve the problems in the conventional technology.

According to an aspect of the present invention, a communication apparatus that is present between each of first and second local area networks (LANs) that includes a user network and a wide area network (WAN), and relays a packet exchanged between the first and second LANs through the WAN while correcting an error in the packet, includes a first determining unit that determines whether to perform error correction on a packet received from the first LAN, and a packet transferring unit that instantly transfers the packet to the second LAN when it is determined not to perform the error correction. The communication apparatus includes a first communication apparatus present between the first LAN and the WAN, and a second communication apparatus present between the second LAN and the WAN.

According to another aspect of the present invention, a communication control method that is applied to a communication apparatus present between each of first and second local area networks (LANs) that includes a user network and a wide area network (WAN) and relaying a packet exchanged between the first and second LANs through the WAN while correcting an error in the packet, includes determining whether to perform error correction on a packet received from the first LAN, and instantly transferring the packet to the second LAN when it is determined not to perform the error correction. The communication apparatus includes a first communication apparatus present between the first LAN and the WAN, and a second communication apparatus present between the second LAN and the WAN.

According to still another aspect of the present invention, a computer-readable recording medium stores therein a computer program that causes a computer to implement the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is an example of the contents of an error ignore (EI) table shown in FIG. 5;

DETAILED DESCRIPTION OF THE PREFERRED EMBODIMENTS

Exemplary embodiments of the present invention will be explained in detail below with reference to the accompanying drawings. In the embodiments, the present invention is applied to a network device present between a WAN and a LAN each constituted by a microwave-multiplex wireless network. However, the present invention is not limited to the embodiments but can also be applied to a network device present between a WAN and a LAN each constituted by a wired network.

Figure 1:
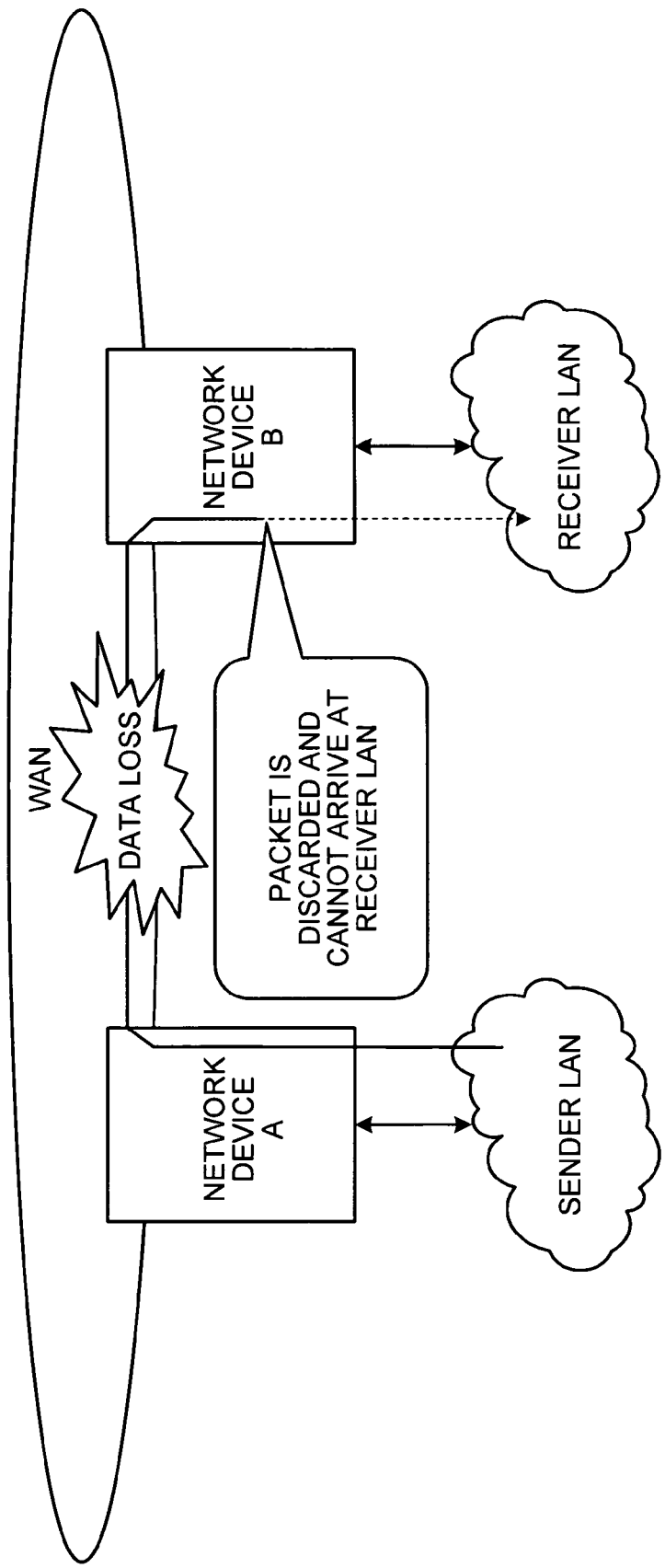
FIG. 1 is a schematic for explaining a disadvantage of a conventional network device.
Figure 2:
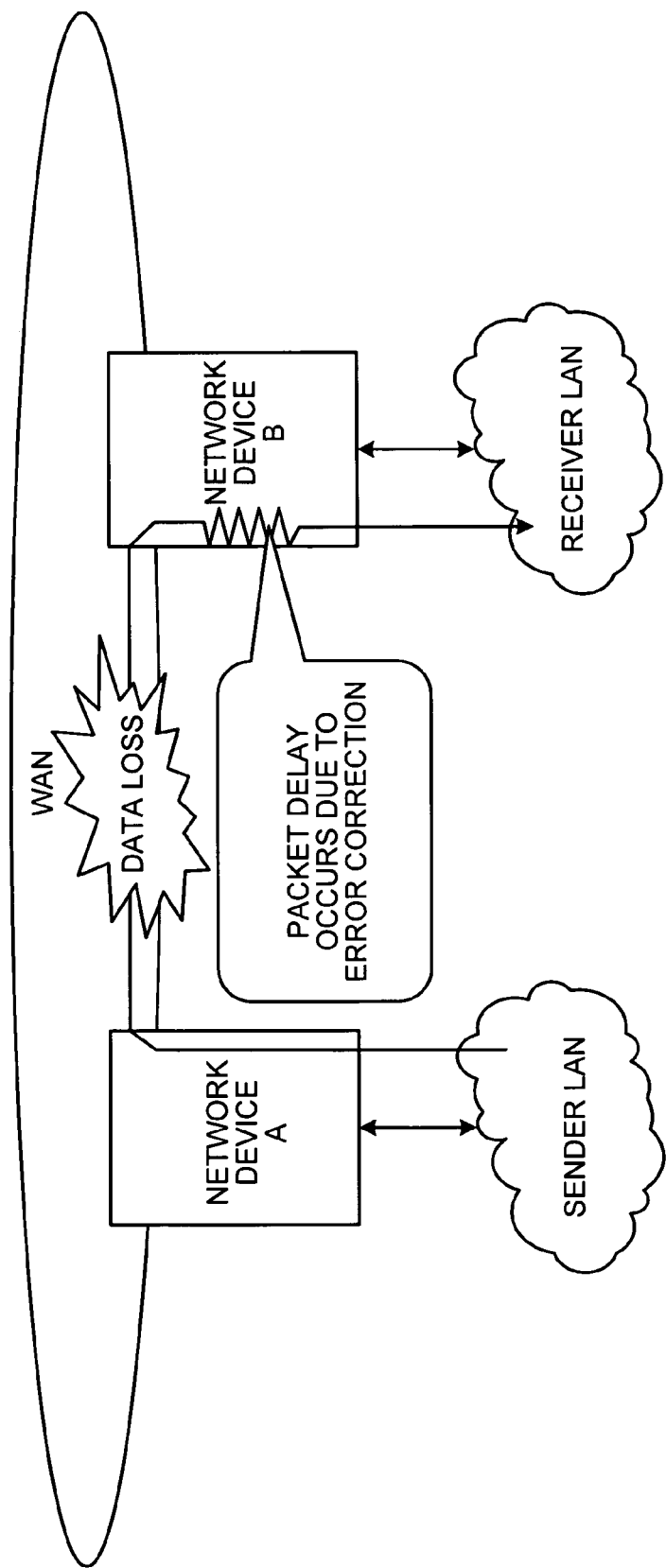
FIG. 2 is a schematic for explaining another disadvantage of the conventional network device.

FIGS. 1 and 2 are schematics for explaining disadvantages of a conventional network device. There are known methods of detecting and correcting an error in a received packet such as a frame check sequence (FCS) method, a cyclic redundancy check (CRC) method, and a forward error correction (FEC) method. If an error in a received packet cannot be corrected by one of these error correcting methods, the conventional network device discards the packet.

As shown in FIG. 1, for example, if data loss occurs in a packet transmitted from a sender LAN to a receiver LAN on a WAN-side link, then a network device B that connects the receiver LAN to a WAN detects the data loss. When an error cannot be corrected, the network device B discards the packet. In this case, naturally, the packet does not arrive at the receiver LAN.

It is now assumed that the data loss is minor data loss that frequently occurs in microwave-multiplex radio communication, and that an error that occurs in received data due to the data loss is negligibly small. If the data loss is detected as an error by a strict error detecting and correcting method, then it is determined that the error cannot be corrected and the packet is discarded. Namely, if the microwave-multiplex radio communication in which minor packet errors frequently occur is used on the WAN-side link, the receiver network device discards almost all received packets. As a result, the practicability of communication between the sender LAN and the receiver LAN is significantly deteriorated.

Besides, as shown in FIG. 2, consider, for example, that if data loss occurs in a packet transmitted from the sender LAN to the receiver LAN on the WAN-side link, the network device B that connects the receiver LAN to the WAN detects the data loss and corrects the error of the packet. If the microwave-multiplex radio communication is used on the WAN-side link, then minor packet errors frequently occur in the microwave-multiplex radio communication, and the network device B acts as a bottleneck for packets related to communication of all terminal devices on the receiver LAN connected to the network device B. Due to this, if the receiver network device B corrects errors in almost all received packets, the error-correction causes packet delay. As a result, the efficiency of communication between the sender LAN and the receiver LAN is significantly deteriorated.

Among the error correcting methods, the FEC method is an error correcting method with which a receiver can correct an error in a packet independently. Therefore, the receiver terminal device on the receiver LAN may correct the error using the FEC method. However, if data errors frequently occur, then erroneous packets are discarded by the receiver network device B, and do not even arrive at the receiver LAN. Due to this, the FEC method cannot produce a great effect on error correction.

The error correction may be performed between the sender network device A and the receiver network device B. However, in this case, it takes each of the sender network device A and the receiver network device B considerable time to perform error correction. It is, therefore, difficult to apply the error correction between the sender network device A and the receiver network device B to a large-scale network that handles time-sensitive traffic such as voice and streaming video.

According to the embodiments of the present invention, by contrast, if a data loss occurs in the WAN-side link, then the network device B on the receiver LAN transfers the packet to the terminal device on the receiver LAN without discarding the packet or correcting an error in the packet. By doing so, the packet never fails to arrive at the terminal device on the receiver LAN, and the terminal device can detect and correct the error in the packet. Namely, the terminal device on the receiver LAN can detect and correct the error in the packet based on a redundant code added to the packet by the terminal device in the sender LAN. End-to-end error correction can be thereby realized, and the deterioration in the practicability and efficiency of communication between the sender LAN and the receiver LAN can be prevented.

Figure 3:
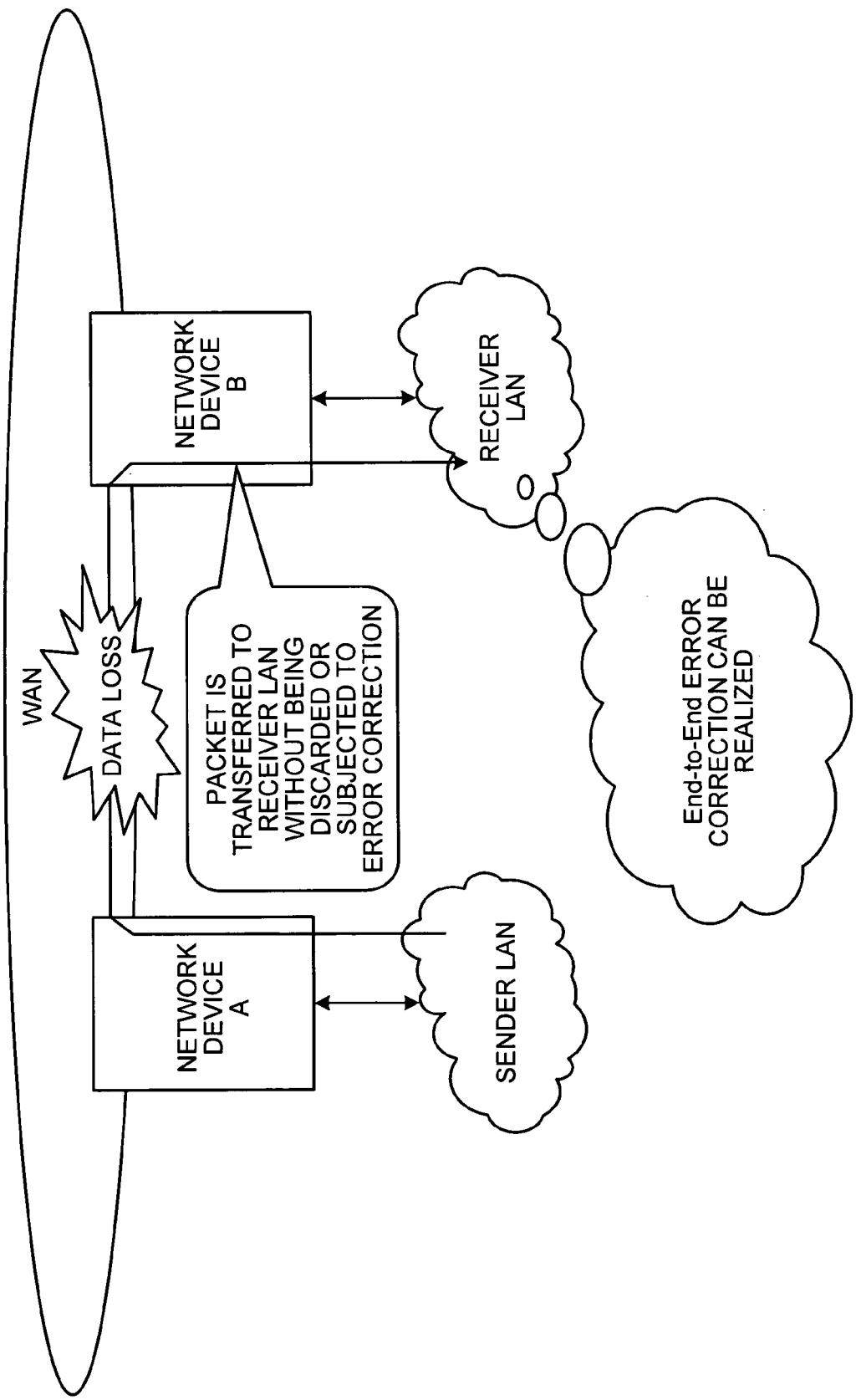
FIG. 3 is a schematic of a network device according to an embodiment of the present invention.
Figure 4:
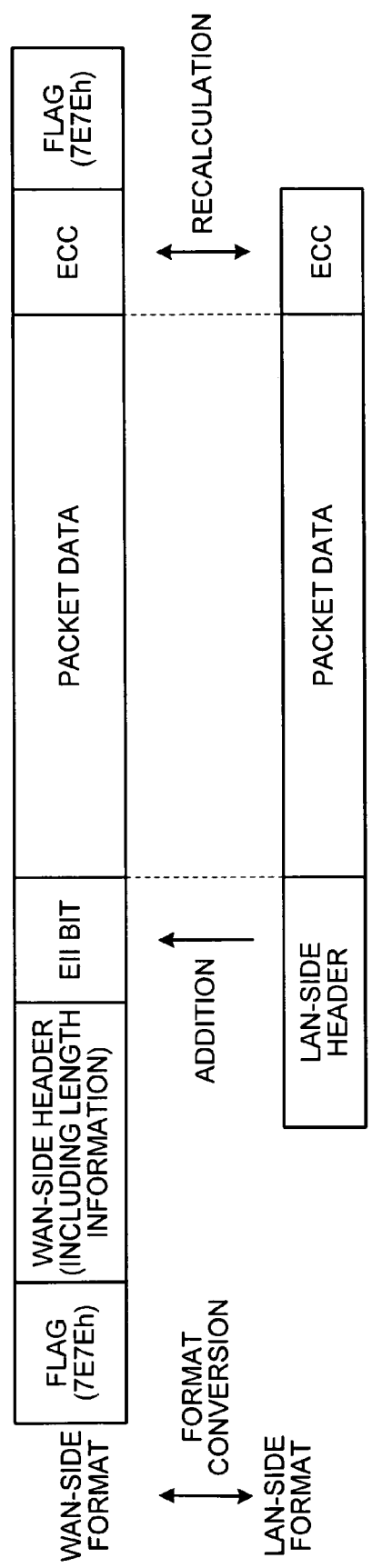
FIG. 4 is a schematic for explaining a format of a packet used by the network device shown in FIG. 3.

FIG. 4 is a schematic for explaining formats of a packet transmitted from the sender LAN to the receiver LAN via the WAN using the network devices A and B shown in FIG. 3. As shown in FIG. 4, a WAN-side format, i.e., a packet format on the WAN-side link, is converted to a LAN-side format, i.e., a packet format on the LAN-side link or vice versa by a packet converting unit included in the network devices.

The packet transmitted from the sender terminal device on the sender LAN is in the LAN-side format in the sender LAN. The LAN-side format includes a LAN-side header of a predetermined number of bits, packet data as a payload, and an error-correcting code (ECC) that is redundant data for error detection and correction.

When the packet in the LAN-side format is input to the sender network device A, the packet converting unit of the sender network device A converts the LAN-side format to the WAN-side format. During the conversion, the packet converting unit adds an error-ignore-identifier (EII) bit to the packet. If the EII bit, which serves as a flag, is ON, the packet is not subjected to the error detection and correction and instantly transferred to the lower receiver LAN. If the EII bit is OFF, the packet is subjected to the error detection and correction. If an error is detected, the packet is transferred to the lower receiver LAN after the error is corrected.

In addition, the ECC recalculated when the packet converting unit in the sender network device A converts the LAN-side format to the WAN-side format is added to the packet in the WAN-side format.

During the conversion, the packet data serving as the payload of the packet in the LAN-side format is embedded in the payload of the packet in the WAN-side format without being converted by the packet converting unit in the sender network device A.

Thus, the packet in the WAN-side format after the conversion additionally includes the EII bit and the recalculated ECC. Namely, the packet in the WAN-side format includes a flag (7E7Eh) indicating the start of the packet, a WAN-side header (including length information), the EII bit, the packet data, the ECC, and a flag (7E7Eh) indicating the end of the packet.

When the receiver network device B receives the packet in the WAN-side format after the conversion, the packet converting unit in the receiver network device B converts the WAN-side format to the LAN-side format. The ECC recalculated when the packet converting unit in the receiver network device B converts the WAN-side format to the LAN-side format is added to the packet in the LAN-side format.

During the conversion, the packet data serving as the payload of the packet in the WAN-side format is embedded in the payload of the packet in the LAN-side format without being converted by the packet converting unit in the receiver network device B.

Thus, the packet in the LAN-side format after the conversion includes a LAN-side header, the packet data, and the ECC recalculated by the packet converting unit in the receiver network device B.

Figure 5:
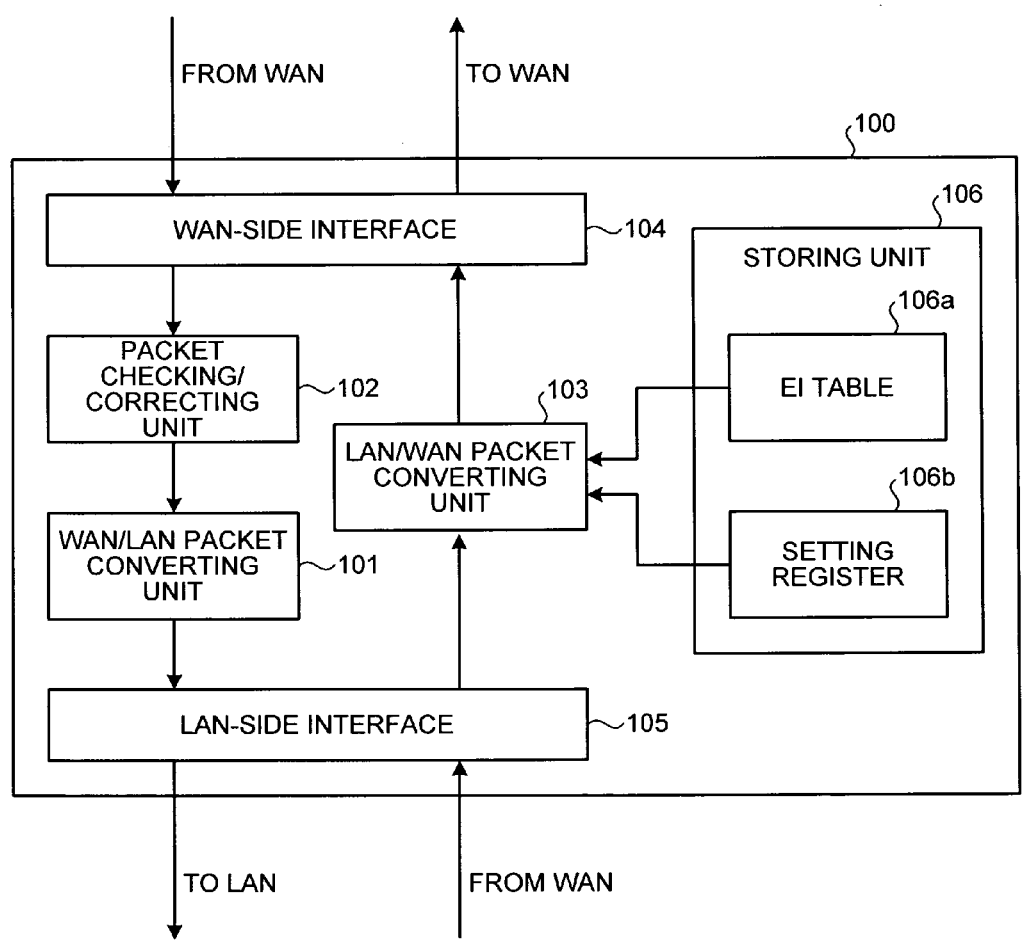
FIG. 5 is a functional block diagram of the network device shown in FIG. 3.

FIG. 5 is a functional block diagram of a network device 100 (network devices A and B shown in FIG. 3). The network device 100 includes a WAN/LAN packet converting unit 101, a packet checking/correcting unit 102, a LAN/WAN packet converting unit 103, a WAN-side interface 104, a LAN-side interface 105, and a storing unit 106.

The WAN/LAN packet converting unit 101 is a protocol converting unit that converts the WAN-side format of a packet received from the packet checking/correcting unit 102 to the LAN-side format. The WAN/LAN packet converting unit 101 sends the packet in the LAN-side format to the LAN-side interface 105.

The packet checking/correcting unit 102 instantly sends a packet in the WAN-side format received from the WAN-side interface 104 to the WAN/LAN packet converting unit 101 when the EII bit of the packet is ON. If the EII bit is OFF, the packet checking/correcting unit 102 detects and corrects an error in the packet.

The LAN/WAN packet converting unit 103 is a protocol converting unit that converts the LAN-side format of a packet received from the LAN-side interface 105 to the WAN-side format. The LAN/WAN packet converting unit 103 sends the packet in the WAN-side format to the WAN-side interface 104.

The WAN-side interface 104 transmits and receives a packet to and from the WAN, and includes at least one port. The LAN-side interface 105 transmits and receives a packet to and from the LAN, and includes a plurality of ports. Among packets input to the LAN-side interface 105 through a specific port among the ports, the packet that satisfies a predetermined condition contains the ON EII bit.

The storing unit 106 includes an error-ignore (EI) table 106a and a setting register 106b. The EI table 106a previously stores therein attributes of the packet the EII bit of which is set to ON. The LAN/WAN packet converting unit 103 refers to the EI table 106a when converting the LAN-side format of a packet to the WAN-side format to determine whether the packet has attributes that match those of the packet the EII bit of which is set to ON.

The setting register 106b designates the specific port among the ports of the LAN-side interface 105. The specific port is used to select the packet which satisfies predetermined conditions, and the EII bit of which is set to ON. The setting register 106b also stores therein a setting as to whether to discard a packet if the packet has a header error according to the result of header check by header checksum (HCS).

FIG. 6 is an example of the contents of the EI table 106a. It is assumed that a protocol for using the EI table is User Datagram Protocol/Internet Protocol (UDP/IP). In FIG. 6, an information item marked with the dash (-) is irrelevant to the corresponding packet. As shown in FIG. 6, the EI table 106a contains columns of media access control (MAC) address, virtual local area network identifier (VLAN-ID), Class of Service (CoS), IP address, protocol, Type of Service/Differentiated services (ToS/Diffserv), destination port number, input port number, and applied/unapplied.

The MAC address column includes columns of a source (MAC address) and a destination (MAC address). The source MAC address indicates the source of a packet, and the destination MAC address indicates the destination of a packet. The VLAN-ID is information for identifying a virtual LAN. The COS is one type of Quality of Service (QoS), and is information indicating the order of priority for band assurance or communication quality assurance.

The IP address column includes columns of a source (IP address) and a destination (IP address). The source IP address indicates the source of a packet, and the destination IP address indicates the destination of a packet.

The protocol is information indicating a protocol type of a packet. The ToS/Diffserv indicates a service type contained in the packet header such as the smallest delay or the maximum reliability required by a higher application. Moreover, to maintain the service quality in the network, the order of priority for packet relay and transfer is specified by the protocol according to the type or characteristics of traffic.

The destination port number is information based on the UDP/IP to identify the application of the destination. The input port number is a number assigned as identification information to each of the ports of the LAN-side interface 105 of the network device 100. The applied/unapplied indicates whether a packet having the attributes in a record is the one to which omission of error detection/correction is applied in the network device 100.

For example, a packet with a source MAC address 00e000520100 and an input port number 1 shown in FIG. 6 is a packet to which omission of error detection/correction is applied in the network device 100 irrespectively of information in the other columns in the record. A packet with a source IP address 192.168.1.2 and a destination port number 10000 is a packet to which omission of error detection/correction is applied in the network device 100 irrespectively of information in the other columns in the record. A packet with a VLAN-ID 200 and an input port number 2 is a packet to which omission of error detection/correction is not applied in the network device 100 irrespectively of information in the other columns in the record.

Figure 7:
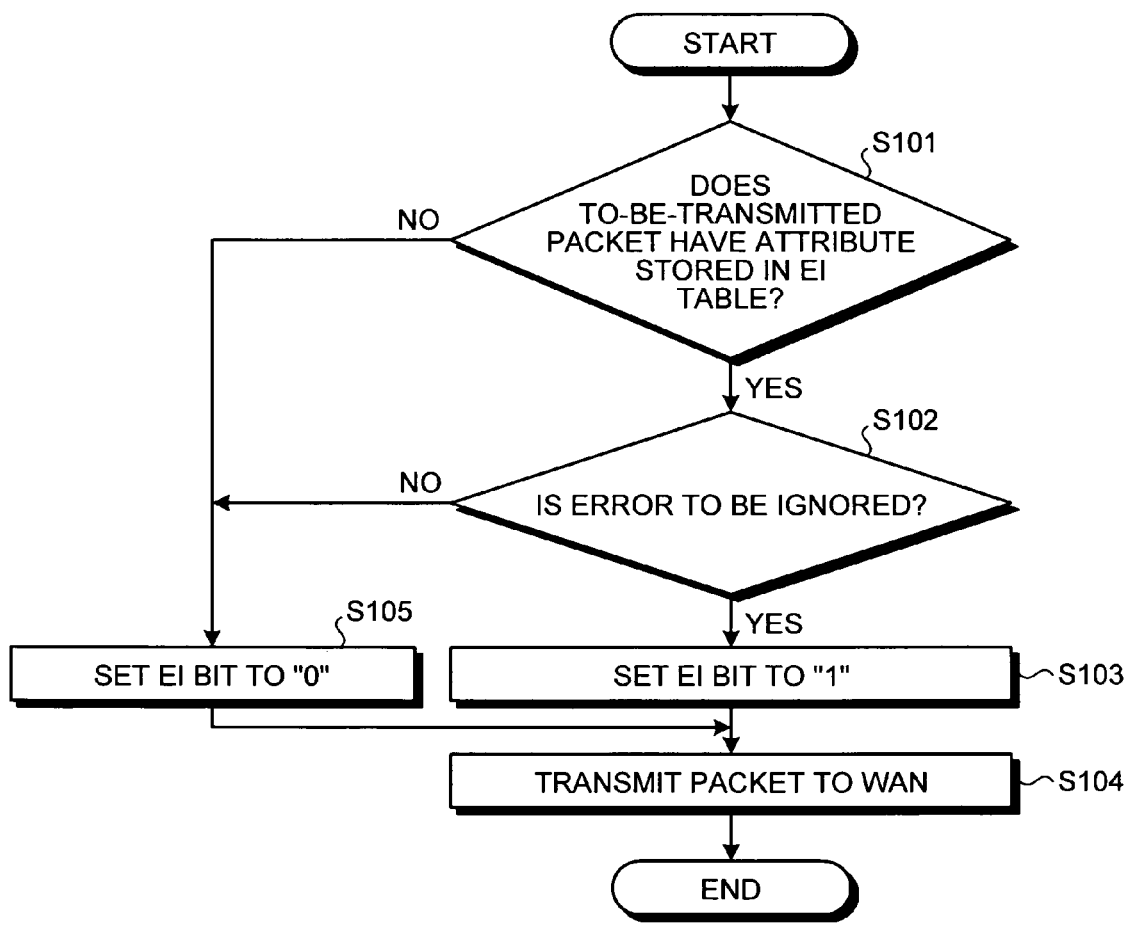
FIG. 7 is a flowchart of packet transmission processing performed by the network device shown in FIG. 3.

FIG. 7 is a flowchart of packet transmission processing performed by the network device A shown in FIG. 3. First, it is determined whether a to-be-transmitted packet (hereinafter, "packet") has the attributes stored in the EI table 106a (step S101). If the packet has the attributes stored in the EI table 106a (Yes at step S101), it is then determined whether to perform error detection/correction referring to the column of "applied/unapplied" in the EI table 106a (step S102). If the packet does not have the attributes stored in the EI table 106a (No at step S101), the process goes to step S105.

If it is determined to not to perform error detection/correction (Yes at step S102), then the EII bit is set to 1 (ON) (step S103), and the process goes to step S104. If it is determined perform error detection/correction (No at step S102), the process goes to step S105. The EII bit is set to 0 (OFF) (step S105). After end of step S103 or S105, the format of the packet is converted to the WAN-side format, and the packet in the WAN-side format is transmitted to the WAN (step S104).

Figure 8:
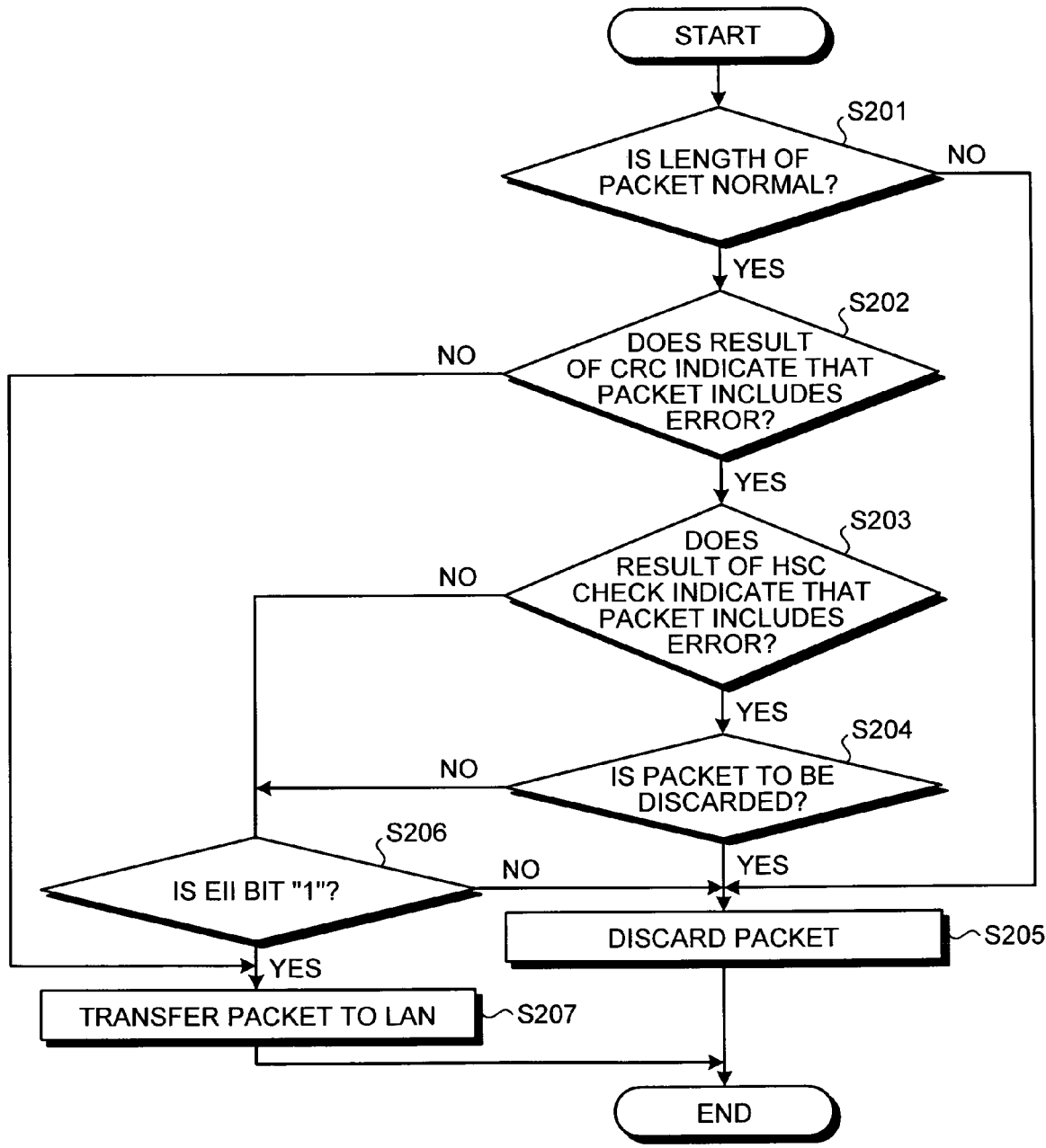
FIG. 8 is a flowchart of packet reception processing performed by the network device shown in FIG. 3.

FIG. 8 is a flowchart of packet reception processing performed by the network device B shown in FIG. 3. First, it is determined whether the length of a received packet (hereinafter, "packet") is normal referring to the length information contained in the WAN-side header (step S201). If the length of the packet is normal (Yes at step S201), the process goes to step S202. If the length of the packet is not normal (No at step S201), the process goes to step S205.

CRC is performed to determine whether the packet contains an error (step S202). If the packet contains an error (Yes at step S202), the process goes to step S203. If the packet does not contain an error (No at step S202), the process goes to step S207.

A HCS check is performed to determine whether the packet contains an error (step S203). If the packet contains an error (Yes at step S203), the process goes to step S204. If the packet does not contain an error (No at step S203), the process goes to step S206.

It is determined whether to discard the packet based on HCS error (step S204). If it is determined to discard the packet (Yes at step S204), the process goes to step S205. If it is not determined to discard the packet (No at step S204), the process goes to step S206. The packet is discarded without being transferred to the LAN (step S205).

It is determined whether the EII bit is 1 (step S206). If the EII bit is 1 (Yes at step S206), the process goes to step S207. If the EII bit is not 1 (No at step S206), the process goes to step S205. The packet is transferred to the LAN after the format of the packet is converted to the LAN-side format (step S207).

In this manner, when the network device 100 receives a packet, the packet length check, the CRC, and the packet head check are performed on the packet. Thereafter, it is determined whether to perform error detection/correction referring to the EII bit. If it is determined not to perform error detection/correction, the packet is instantly transferred to the receiver LAN. Therefore, end-to-end error correction can be accomplished between the sender terminal device on the sender LAN and the receiver terminal device on the receiver LAN.

Moreover, if the error is detected by the packet length check, the CRC or the HSC check on the packet, the packet is discarded. It is, therefore, possible to screen the packet to be discarded by a relatively simple process, reduce the processing burden on the network device 100, and enhance the communication efficiency of the network.

Furthermore, only the packet in which a serious packet error such as a packet length error, a CRC error or a header information error occurs is discarded. Therefore, as many packets as possible are transferred to the receiver LAN. This realizes the end-to-end error correction between the sender terminal device on the sender LAN and the receiver terminal device on the receiver LAN. It is, therefore, possible to enhance the practicability of the network.

As described above, according to the embodiment, the network including a section with low communication quality (e.g., the WAN using the microwave-multiplex radio communication) can make effective use of the error-correcting function of a network device on the lower network, i.e., LAN connected to the network. It is, therefore, possible to construct a high-quality network.

In the embodiment, it is assumed that the network device 100 is an L3 switch, the LAN-side interface 105 is an L2/L3 switch, and the network interface of the terminal device on the LAN is an L1 switch. Thus, it is ensured that the lowest L1 switch corrects an error in a packet without causing the highest L3 switch to detect and correct the error. Therefore, efficiently constructing the high-quality network can be efficiently constructed.

Incidentally, the above processing can be realized by executing a computer program, e.g., a microprogram or a microcode program, on a control circuit including a microcontroller unit or the like of the network device.

In the embodiment, the receiver network device determines whether to perform packet error detection/correction referring to the EI table. Even if a packet is input from the specific port of the LAN-side interface, it is merely one condition to make the determination. However, the present invention is not so limited, and the EI table is not necessarily used. In this case, the fact that a packet is input from the specific port of the LAN-side interface can be set as only one condition under which it is determined whether to perform packet error detection/correction in the receiver network device. By doing so, it is possible to configure the network device more simply.

As set forth hereinabove, according to an embodiment of the present invention, when it is determined not to perform error detection/correction on a received packet, the received packet is instantly transferred to the LAN. Thus, even if a packet error occurs on the WAN-side link, the receiver LAN can correct the packet error in an end-to-end manner.

Moreover, information indicating whether to perform error correction is added to a packet. Therefore, an error-correction target packet can be identified on the receiver side. When a packet is input from the specific port of the LAN-side interface, information indicating that the packet is the error correction target is added to the packet. It is, therefore, possible to add the information to the packet by the simple method of discriminating the input port.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A computer-readable recording medium that stores therein a computer program to be executed on a control circuit of a communication apparatus for performing communication control processing, the communication apparatus being present between each of first and second local area networks (LANs) that includes a user network and a wide area network (WAN), and relaying a packet exchanged between the first and second LANs through the WAN while correcting an error in the packet, the computer program causing the control circuit to execute:
   determining whether to perform error correction on a packet received from the first LAN;
   adding, to a packet to be transmitted to the second LAN, information indicating that the packet is an error-correction target when the packet has been input from a predetermined port among a plurality of ports of an interface to the first LAN; and
   instantly transferring the packet to the second LAN when it is determined not to perform the error correction, wherein
   the communication apparatus includes a first communication apparatus present between the first LAN and the WAN, and a second communication apparatus present between the second LAN and the WAN.

2. The computer-readable recording medium according to claim 1, wherein the computer program further causes the control circuit to execute:
   determining whether the packet to be transmitted to the second LAN is the error-correction target in the second communication apparatus by referring to information as to whether the packet is the error-correction target; and
   adding, to the packet, information indicating that the packet is the error-correction target based on determination that the packet is the error-correction target in the second communication apparatus.

3. The computer-readable recording medium according to claim 1, wherein the computer program further causes the control circuit to execute:
   verifying whether the packet contains at least one of a packet length error, an error-correcting code error and a header information error before the determining; and
   discarding the packet when the packet contains any one of the packet length error, the error-correcting code error and the header information error, and it is determined not to perform the error correction.

4. A communication apparatus that is present between each of first and second local area networks (LANs) that includes a user network and a wide area network (WAN), and relays a packet exchanged between the first and second LANs through the WAN while correcting an error in the packet, the communication apparatus comprising:
   a first determining unit that determines whether to perform error correction on a packet received from the first LAN;
   a first adding unit that adds, to a packet to be transmitted to the second LAN, information indicating that the packet is an error-correction target when the packet is input from a predetermined port among the ports; and
   a packet transferring unit that instantly transfers the packet to the second LAN when it is determined not to perform the error correction, wherein
   the communication apparatus includes a first communication apparatus present between the first LAN and the WAN, and a second communication apparatus present between the second LAN and the WAN.

5. The communication apparatus according to claim 4, further comprising:
- a storing unit that stores therein information as to whether the packet to be transmitted to the second LAN is the error-correction target in the second communication apparatus;
- a second determining unit that determines whether the packet is the error- correction target in the second communication apparatus while referring to the information; and
- a second adding unit that adds, to the packet, information indicating that the packet is the error-correction target based on determination that the packet is the error-correction target in the second communication apparatus.

6. The communication apparatus according to claim 4, further comprising:
- a verifying unit that verifies whether the packet contains at least one of a packet length error, an error-correcting code error and a header information error before determination of the first determining unit; and
- a discarding unit that discards the packet when the packet contains any one of the packet length error, the error-correcting code error and the header information error, and it is determined not to perform the error correction.

7. A communication control method that is applied to a communication apparatus present between each of first and second local area networks (LANs) that includes a user network and a wide area network (WAN) and relaying a packet exchanged between the first and second LANs through the WAN while correcting an error in the packet, the communication control method comprising:
- determining whether to perform error correction on a packet received from the first LAN;
- adding, to a packet to be transmitted to the second LAN, information indicating that the packet is an error-correction target when the packet has been input from a predetermined port among a plurality of ports of an interface to the first LAN; and
- instantly transferring the packet to the second LAN when it is determined not to perform the error correction, wherein
- the communication apparatus includes a first communication apparatus present between the first LAN and the WAN, and a second communication apparatus present between the second LAN and the WAN.

8. The communication control method according to claim 7, further comprising:
- the first communication apparatus storing information as to whether the packet to be transmitted to the second LAN is the error-correction target in the second communication apparatus;
- the first communication apparatus determining whether the packet is the error-correction target in the second communication apparatus while referring to the information; and
- the first communication apparatus adding, to the packet, information indicating that the packet is the error-correction target based on determination that the packet is the error-correction target in the second communication apparatus.

9. The communication control method according to claim 7, further comprising:
- verifying whether the packet contains at least one of a packet length error, an error-correcting code error and a header information error before the determining; and
- discarding the packet when the packet contains any one of the packet length error, the error-correcting code error and the header information error, and it is determined not to perform the error correction.

* * * * *